(12) United States Patent
Farhady Ghalaty et al.

(10) Patent No.: US 12,301,722 B2
(45) Date of Patent: May 13, 2025

(54) SYSTEMS AND METHODS FOR USER IDENTIFICATION AND/OR RETRIEVAL OF USER-RELATED DATA AT A LOCAL AUXILIARY SYSTEM

(71) Applicant: Capital One Services, LLC, McLean, VA (US)

(72) Inventors: Nahid Farhady Ghalaty, Fairfax, VA (US); Lee Adcock, Midlothian, VA (US); Benjamin Polk, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 342 days.

(21) Appl. No.: 17/810,560

(22) Filed: Jul. 1, 2022

(65) Prior Publication Data

US 2024/0007293 A1     Jan. 4, 2024

(51) Int. Cl.
*H04L 9/32* (2006.01)
*G06Q 10/1093* (2023.01)

(52) U.S. Cl.
CPC ....... *H04L 9/3228* (2013.01); *G06Q 10/1095* (2013.01); *H04L 9/3213* (2013.01); *H04L 9/3239* (2013.01)

(58) Field of Classification Search
CPC ... H04L 9/3228; H04L 9/3213; H04L 9/3239; G06Q 10/1095

USPC .......................................................... 713/185
See application file for complete search history.

(56) References Cited

U.S. PATENT DOCUMENTS

| | | | |
|---|---|---|---|
| 11,126,670 B2 * | 9/2021 | Pandey | G06F 16/951 |
| 11,558,193 B2 * | 1/2023 | Acharya | H04L 9/3213 |
| 2018/0283889 A1 * | 10/2018 | Koo | G01C 21/3484 |
| 2021/0288973 A1 * | 9/2021 | Dimble | H04W 12/108 |
| 2022/0021985 A1 * | 1/2022 | Wexler | G10L 25/51 |
| 2022/0116385 A1 * | 4/2022 | Hertrich | H04L 9/3213 |
| 2023/0289416 A1 * | 9/2023 | Arai | G07F 9/023 |

* cited by examiner

*Primary Examiner* — Moeen Khan
(74) *Attorney, Agent, or Firm* — Foley & Lardner LLP

(57) ABSTRACT

Systems and methods described herein may generate a temporary location-associated cryptographic identification code (which can be used to uniquely identify the user) based on detection of the user at the associated location. As an example, such systems and methods allow for the user to be identified (e.g., as part of an authentication process) when the user visits a location without having to share personally identifiable information with any other users or computing systems at the location. Additionally, or alternatively, such systems and methods enable the practical use of shorter cryptographic identification codes as a primary identifier (or sole identifier) at the location for retrieving data related to the user (e.g., by avoiding or mitigating collision or security risks typically associated with short identifiers).

20 Claims, 5 Drawing Sheets

|  | Low 202 | Medium 204 | High 206 |
|---|---|---|---|
| Code | Yes | Yes | Yes |
| Token | No | Yes | Yes |
| Biometric | No | No | Yes |

SYSTEMS AND METHODS FOR USER IDENTIFICATION AND/OR RETRIEVAL OF USER-RELATED DATA AT A LOCAL AUXILIARY SYSTEM

BACKGROUND

Users should be authenticated prior to accessing one or more network services. For example, a user may need to enter a username and password before being granted access to a network service. When a user visits a location in person, the user may need to present information to verify that the user is who the user is claiming to be. For example, the user may present a token or other personally identifiable information (PIT) in the form of an ID card (e.g., driver's license, passport, etc.) to an employee working at the location. After verifying the user's identity, the employee may provide the user with physical or data access or enable the user to perform various network actions.

SUMMARY

Systems and methods are described herein for novel uses and/or improvements related to user identification and/or retrieval of user-related data (e.g., by an auxiliary system without providing PII of the corresponding user to the auxiliary system).

With respect to conventional computing systems, for example, a user is often required to provide some form of PII, such as a physical address or an account identifier that can be easily traced back to the user at some later time, to gain access to one or more network services. For example, when a user visits a location in person, an employee that works at the location must serve as a gatekeeper to verify the identity of the user and determine whether the user should be granted access to the user's account. Conventional techniques for verifying the user's identity include the user providing PII of the user to the employee and the employee entering the PII into the employee's local system to confirm the user's identity. This approach is problematic because the employee (and/or the local system) gains access to the PII of the user. This can have negative consequences for the privacy of the user because the employee may use the PII for nefarious purposes without the permission of the user. Additionally, or alternatively, if the local system is compromised (e.g., with malware), the user's PII may be stolen, or the user's interactions with a network service may be unknowingly tracked.

To address these problems, nonconventional systems and methods described herein may generate a temporary location-associated cryptographic identification code (which can be used to uniquely identify the user) based on detection of the user at the associated location. As an example, such systems and methods allow for the user to be identified (e.g., as part of an authentication process) when the user visits a location without having to share PII with any other users or computing systems at the location. Additionally, or alternatively, such systems and methods enable the practical use of shorter cryptographic identification codes as a primary identifier (or sole identifier) at the location for retrieving data related to the user (e.g., by avoiding or mitigating collision or security risks typically associated with short identifiers). For example, although short identifiers are generally easier to use by users in certain scenarios (e.g., because short identifiers are easier to remember, share, or manually input, and thereby improve the user experience, as compared to long identifiers), the significantly smaller number of possible identifiers (that can be generated with a short length) increases the risks from collisions (e.g., the same identifier is assigned to two or more users at a given time) or security hacks (e.g., due to shorter identifiers being easier to guess or discover through brute force).

In some embodiments, a server system may receive location information from a mobile device of a user. In response to the user location matching a location of a local system, the server system may generate a temporary hash identification code used to identify and authenticate the user. For example, the user's mobile device may send a message to the server system when the user is located within a store associated with the server system. The message may cause the server system to generate and store the temporary hash identification code in association with the user and the local system. The mobile device or an application executing on the mobile device may have access to information needed to generate the same temporary hash identification code. The mobile device may communicate with the local system and may send the temporary hash identification code to the local system. The local system may send the received code to the server system along with a request for data related to the user. The server system may use the received code along with a store/local system identifier of the local system to identify the user by determining a match between the received code and the temporary hash identification code (stored in association with the user and the local system). Based on the identification, the server system may send the requested information to the local system. This may enable the local system to provide the data and services needed to the user without the local system accessing or processing any PII of the user. Additionally, or alternatively, because the temporary hash identification code is stored in association with the local system, the store/local system identifier may be used as part of the identification process to map the temporary hash identification code to the user (e.g., the combination of the temporary hash identification code and the store/local system identifier may effectively serve as a global unique identifier for the user during a given time period). This may enable the use of shorter temporary hash identification codes because each code need be unique only for each user at one location with respect to a given time period, rather than requiring each code to be unique across all users across the server system.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows example authentication levels, in accordance with some embodiments.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, some structures and devices are shown in block diagram form to avoid unnecessarily obscuring the disclosure.

Figure 1:
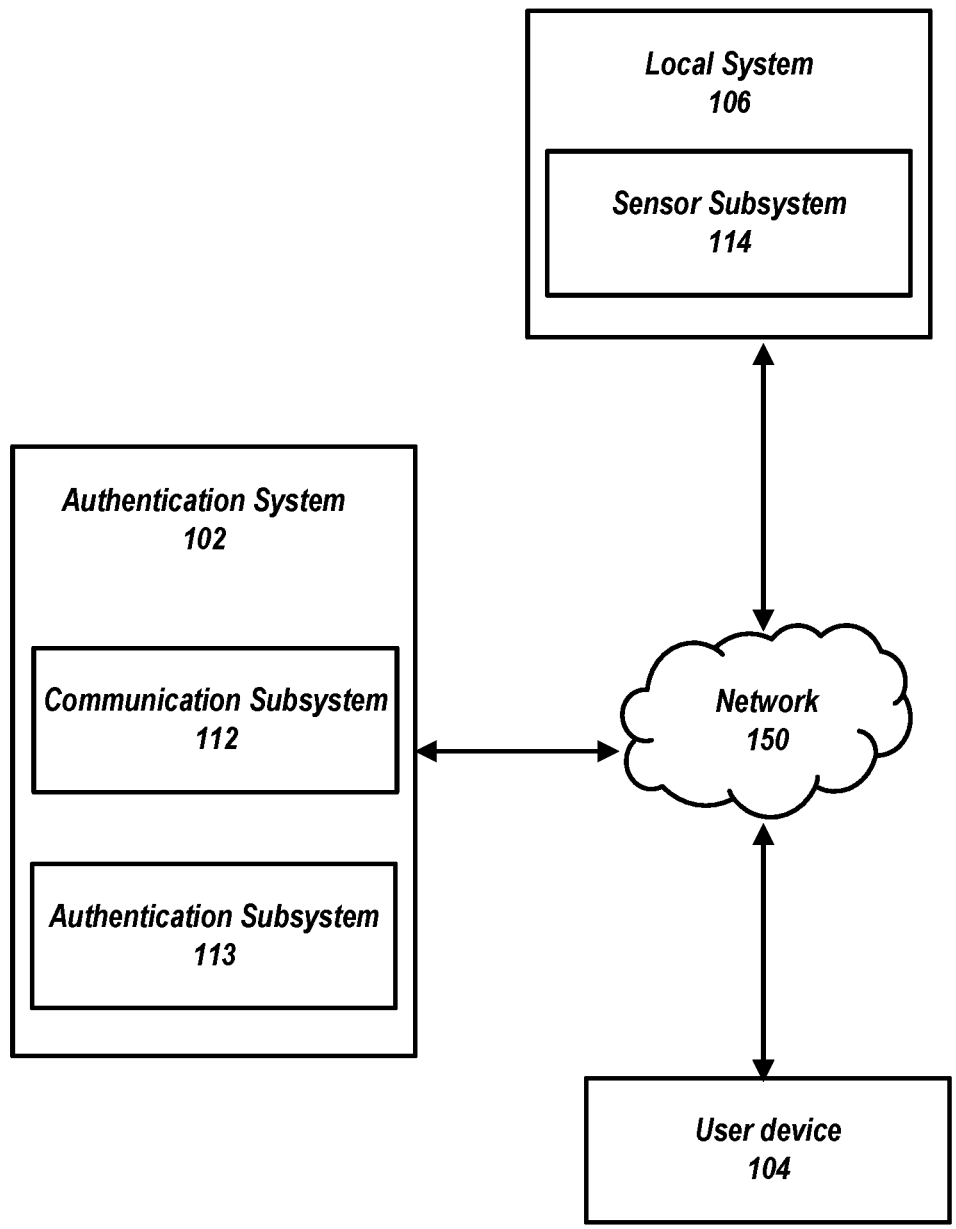
FIG. 1 shows an example system for authenticating users, in accordance with some embodiments.

FIG. 1 shows an example system 100 for authenticating users. The system 100 may include an authentication system 102 (e.g., at a server system), a user device 104 (or user devices 104), a local system 106 (or local/auxiliary systems 106), or other components. The authentication system 102 may include a communication subsystem 112, an authentication subsystem 113, or other components. The local system 106 may include a sensor subsystem 114 or other components.

In some embodiments, authentication system 102 may receive location information from a mobile device. In response to the user location matching a location of a local device, the authentication system 102 may generate a temporary cryptographic identification code (e.g., a temporary hash identification code) used to identify and authenticate the user. For example, a user's mobile device may send a message to the authentication system 102 when the user is located within a store associated with the authentication system 102. The message may cause the authentication system 102 to generate the temporary cryptographic identification code. The mobile device or an application executing on the mobile device may have access to information needed to generate the same temporary cryptographic identification code (e.g., the same cryptographic function that uses a shared secret and the current time—e.g., the current hour, the current minute, etc.—as a seed or other input to generate the temporary cryptographic identification code). The mobile device may communicate with the local device and may send the temporary cryptographic identification code to the local device. Alternatively, the user may read the code to an employee or other user operating the local device, and the employee may input the code into the local device. The local device may send the received code to the authentication system 102 along with a request for data related to the user. The authentication system 102 may compare the code received from the local device with the temporary cryptographic identification code that was generated by the computing device. If the two codes match, the authentication system 102 may authenticate the user and send the requested information to the local device. It should be noted that, while embodiments herein may describe the generation or use of a temporary hash identification code, it is contemplated that other embodiments may alternatively utilize another type of cryptographic code as the temporary identification code (e.g., via one or more other non-hash cryptographic algorithms, a pseudorandom number generator, etc.).

Nonconventional systems and methods described herein may use cryptography to generate a temporary identification code that can be used to uniquely identify the user without having to share PII with any other users or computing systems at a location. Further, to enable the practical use of shorter codes as a temporary identification code, nonconventional systems and methods described herein may store the temporary cryptographic identification code in association with the location in connection with the user being detected at or in proximity to the location. For example, the temporary cryptographic identification code may be mapped to an ID of the location. This may enable such temporary cryptographic identification codes to have a shorter fixed (or maximum) length because each code need be unique only for each user at one location, rather than requiring each code to be unique across all users across the computing system. As used herein, personally identifiable information or PII may include a name, home or other address, email address, Social Security number, passport number, driver's license number, date of birth, telephone number, owned properties (e.g., wallet addresses, vehicle identification number (VIN), etc.), login user identifier, processor or device serial numbers, media access control (MAC) address, Internet Protocol (IP) address, or other PII.

The authentication system 102 may receive location information. The location information may indicate a location of a user of the user device 104. For example, an application executing on the user device 104 may access location information via a global positioning system (GPS), Bluetooth (e.g., by communicating with other devices nearby to determine a location), radio frequency identification (RFID), simultaneous localization and mapping (SLAM), or a variety of other means. The application may be associated with the local system 106. For example, the application may be configured to communicate with the local system 106 or the authentication system 102.

The user device 104 may send the location information to the authentication system 102. For example, if the user device 104 determines that it is within a threshold distance (e.g., 10 feet, 50 feet, etc.) of the local system 106, the user device 104 may determine to send the location information to the authentication system 102. The user device 104 may encrypt the location information (e.g., using a private key) prior to sending it to the authentication system 102. The authentication system 102 may determine, based on data related to the user (e.g., PII), a public key corresponding to the user device 104. The authentication system 102 may decrypt the location information using the public key.

In some embodiments, the authentication system 102 may generate a temporary hash identification code. The authentication system 102 may generate the temporary hash identification code, for example, in response to determining that the location information matches a location of the local system 106. The temporary hash identification code may be used to authenticate the user via the local system 106 during a given time period. Additionally, the temporary hash identification code may allow authentication of the user without providing PII of the user to the local system 106. This may enhance the security of the system 100 because sensitive information may not need to be accessed or stored by the local system 106 (e.g., which may be located in high traffic areas and may be subject to computer network attacks, or which malicious actors may be able to physically access).

For example, the authentication system 102 may send the temporary hash identification code to the user after determining that the user has entered a location (e.g., a store). The temporary hash identification code may be generated such that the code is valid until the user has left the store. For example, the user device 104 may send a message (e.g., a heartbeat message) to the authentication system 102 periodically (e.g., every 30 seconds, every 5 minutes, etc.) while the user device 104 is within the threshold distance of the local system 106 or a location associated with the local system 106. If more than a threshold time goes by without receiving a message from the user device 104, the authentication system 102 may revoke the temporary hash identification code. Additionally, or alternatively, the authentication system 102 may generate the temporary hash identification code such that the code expires within a threshold period of time. For example, the code may expire after 5 minutes, 15 minutes, 30 minutes, or some other time period.

In some embodiments, the temporary hash identification code may be invalid for authenticating the user via one or more other auxiliary systems at one or more other locations without the one or more other auxiliary systems obtaining any PII of the user. Additionally, through the use of the temporary hash identification code, the local system 106 or any other local system may not need to obtain PII (e.g., name, address, Social Security number, etc.) of the user to access account information, transaction information, or other data associated with the user.

In some embodiments, the temporary hash identification code may be generated via a hash function based on a user identifier associated with the user and a current time. For example, the identification code may be a one-time password, a time-based one-time password, or a hash message authentication code (HMAC) one-time password (HOTP). For example, the authentication system 102 may use a variety of parameters, including the current time (e.g., the time the location information was received), a cryptographic hash method (e.g., SHA-1), a secret key, a counter, and an HOTP value length (e.g., 6 characters, 8 characters, 10 characters, etc.) to generate the temporary hash identification code. The temporary hash identification code may use PII of the user as input into the hash method. For example, the user's name or address may be used as input into the hash method to generate the identification code.

In some embodiments, the temporary hash identification code may be regenerated (e.g., a different temporary hash identification code may be generated) if, for example, the code matches another code generated for another user at the same location. For example, if the user's address is used as input to generate the code and the code matches another code generated for another user, alternative data (e.g., the user's date of birth) may be used as input to generate a different code. This may enable the authentication system 102 to generate short codes while still enabling each code to uniquely identify a user at the location.

In some embodiments, the authentication system 102 may send the temporary hash identification code to the mobile device as an identification code for the user for authenticating at the local system 106. For example, the temporary hash identification code may be input at the local system 106. The local system 106 may send the entered temporary hash identification code to the authentication system 102 for authentication. For example, if the temporary hash identification code received by the authentication system 102 matches the code sent by the local system, the authentication system 102 may authenticate the user.

In some embodiments, the authentication system 102 may not send the temporary hash identification code to the user device 104. Instead, the user device 104 may generate the temporary hash identification code. For example, the user device 104 may have access (e.g., via an application associated with the authentication system 102) to the variety of parameters discussed above and may use them to generate the temporary hash identification code.

In some embodiments, the user device 104 may send the temporary hash identification code to the local system 106. The user device 104 may send a request for data associated with the user to the authentication system 102. The request may include the temporary hash identification code. The authentication system 102 may receive the request to access data from the local system 106. For example, the local system 106 may send a request to the authentication system 102 for access to data associated with the user. The local system 106 may use the temporary hash identification code to retrieve information associated with a user of the user device 104. For example, if the local system 106 is associated with a bank, the local system 106 may use the temporary hash identification code to retrieve banking information such as credit scores, transaction information, account information (e.g., types of accounts, account balances, etc.), or a variety of other information. The banking information obtained by the local system 106 may exclude any PII of the user.

The authentication system 102 may grant access to the data requested by the local system 106. For example, the authentication system 102 may provide the requested access to the local system 106 by authenticating the user based on the temporary hash identification code. The authentication system 102 may also authenticate the user based on an auxiliary identifier (e.g., that identifies the local system 106) in the data access request. For example, the authentication system 102 may confirm that the identifier in the data access request corresponds to the location information received from the user device 104. This may prevent the authentication system 102 from sending the requested data to a device that is not the local system 106. The auxiliary identifier may be an IP address or other identifier.

In some embodiments, the authentication system 102 may use a variety of other factors to authenticate a user, for example, in addition to the temporary hash identification code. The use of additional factors may increase the confidence of the authentication system 102 in its authentication determinations.

In some embodiments, authentication system 102 may use a token (e.g., a physical token, a digital token, etc.) to further authenticate the user. In some embodiments, the local system 106 may obtain PII of the user but may prevent other users from viewing the PII. For example, the local system 106 may scan or read data from a physical token and may use the data to communicate with the authentication system 102 to authenticate the user, without displaying the data to other users at the location of the local system 106 (e.g., to employees, other customers, etc.).

In some embodiments, the user may present a token (e.g., an identity token such as a driver's license, passport, debit card, digital identification, or other item that can be used to identify the user) to the local system 106. The sensor subsystem 114 may scan the token presented by the user. For example, the user may insert the token into the local system 106 or the sensor subsystem 114. In some embodiments, the user may send a digital token to the local system 106 via the user device 104. The sensor subsystem 114 may create a scanned image and perform optical character recognition on the scanned image to obtain token text. The local system 106 may compare the token text with second text associated with the user. For example, the second text may be user-related data obtained from the authentication system 102. The second text may be data contained in a user profile of the user and may include PII. The local system 106 may determine that a portion of the token text matches a corresponding portion of the second text. For example, the local system 106 may confirm that the name, birth date, or address of the data received from the authentication system 102 matches the text of the token. In response to determining that a portion of the token text matches a corresponding portion of the second text, the local system 106 or the authentication system 102 may authenticate the user.

In some embodiments, the token may include a credit card, debit card, or other token that contains a chip. The local system 106 may obtain (e.g., via a chip reader in the sensor subsystem 114) token information of the token presented by user. The token information may include PII of the user. The local system 106 may determine that the token information or a portion of the token information (e.g., an identifier of the user) matches user-related data received from the authentication system 102. In response to determining that an identifier of the token information matches the user-related data (e.g., an identifier associated with the user), the local system 106 or the authentication system 102 may authenticate the user.

In some embodiments, the authentication system 102 may further authenticate the user using appointment information corresponding to the user. The authentication system 102 may retrieve appointment information associated with the user and the location. For example, the appointment information may indicate that the user has an appointment to visit the location at 11:00 a.m. The authentication system 102 may determine, based on the appointment information, that the user is expected to be at the location at a time associated with the temporary hash identification code. The authentication system 102 may determine whether the time at which the location information was received from the user device 104 is within a threshold time (e.g., within minutes, 15 minutes, 30 minutes, etc.) indicated by the appointment information. For example, if the appointment time is 11:00 a.m. and the time at which the location information was received by the authentication system 102 is 11:05 a.m., then the authentication system 102 may authenticate the user because the time difference between the two is less than a threshold time (e.g., less than 15 minutes).

In some embodiments, the authentication system 106 may further authenticate a user using biometric data received from the local system 106. To further confirm the identity of the user, biometric data may be used in addition to the temporary hash identification code. The authentication system may obtain, via a camera at the location, a first image depicting the user at the location. The authentication system may determine (e.g., via a machine learning model as described in FIG. 3 below) that a second image matches the first image. For example, the second image may be a user profile image stored at the authentication system 102. The user profile image may have been approved by the user (e.g., by sending input via the user device). The authentication system may use a machine learning model to determine whether the face in the second image matches the face of the user in the first image. The authentication system 102 may authenticate the user based on determining that the second image matches the first image (e.g., that a face in the second image matches a face in the first image). The authentication system 102 may use the first image as training data to further train the machine learning model and improve its accuracy in recognizing the user in the future.

In some embodiments, the authentication system 102 may use a number of factors for authentication depending on an action that the user wishes to perform at the location. Referring to FIG. 2, example authentication levels 200 are shown. The authentication system 102 may perform a low-level authentication 202 using just the temporary hash identification code. The authentication system 102 may perform a medium-level authentication 204 using the temporary hash identification code and a token (e.g., a physical or digital token as discussed above). The authentication system 102 may perform a high-level authentication 206 using the temporary hash identification code, a token, and a biometric (e.g., facial recognition as described above) to authenticate the user.

The user device 104 may be any computing device, including, but not limited to, a laptop computer, a tablet computer, a hand-held computer, a smartphone, or other computer equipment (e.g., a server or virtual server), including "smart," wireless, wearable, or mobile devices.

The authentication system 102 may include one or more computing devices described above or may include any type of mobile terminal, fixed terminal, or other device. For example, the authentication system 102 may be implemented as a cloud-computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the authentication system 102, those operations may be performed by components of the user device 104 or the local system 106. In some embodiments, the various computers and systems described herein may include one or more computing devices that are programmed to perform the described functions.

One or more components of the authentication system 102, the user device 104, or the local system 106 may receive content or data via input/output (I/O) paths. The one or more components of the authentication system 102, the user device 104, or the local system 106 may include processors or control circuitry to send and receive commands, requests, and other suitable data using the I/O paths. The control circuitry may include any suitable processing, storage, or I/O circuitry. Each of these devices may include a user input interface or user output interface (e.g., a display) for use in receiving and displaying data. It should be noted that, in some embodiments, the authentication system 102, the user device 104, or the local system 106 may have neither user input interfaces nor displays and may instead receive and display content using another device (e.g., a dedicated display device such as a computer screen or a dedicated input device, such as a remote control, mouse, voice input, etc.).

One or more components or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices, or (b) removable storage that is removably connectable to the servers or client devices via, for example, a port (e.g., a universal serial bus (USB) port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical chargebased storage media (e.g., EEPROM, random access memory (RAM), etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a fifth generation (5G) or Long-Term Evolution (LTE) network), a cable network, a satellite network, a combination of these networks, or other types of communication networks or combinations of communication networks. The devices in FIG. 1 (e.g., the authentication system 102, the user device 104, or the local system 106) may communicate (e.g., with each other or other computing systems not shown in FIG. 1) via the network 150 using one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The devices in FIG. 1 may include additional communication paths linking hardware, software, or firmware components operating together. For example, the authentication system 102, any component of the processing system (e.g., the communication subsystem 112, the sensor subsystem 114, or the authentication subsystem 113), the user device 104, or the local system 106 may be implemented by one or more computing platforms.

Figure 4:
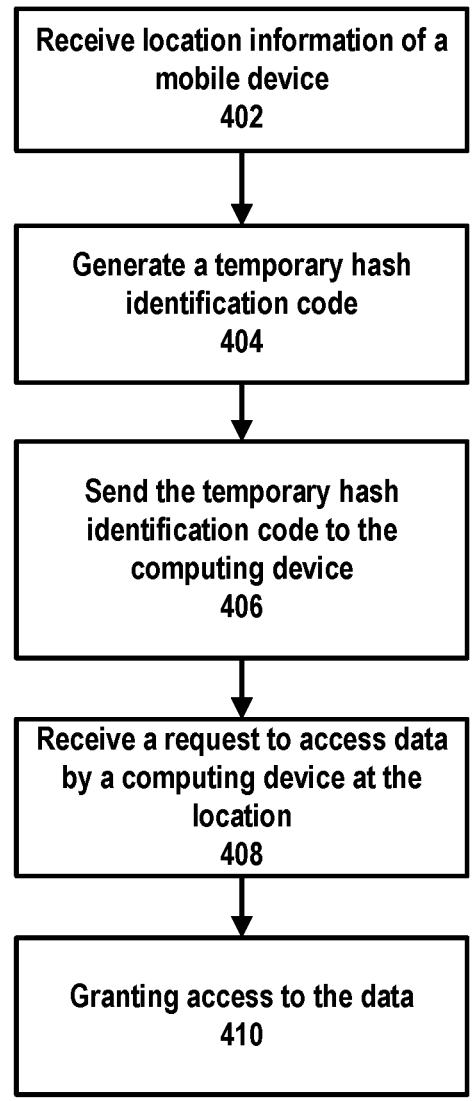
FIG. 4 shows an example flowchart of the actions involved in user authentication, in accordance with some embodiments.

FIG. 4 is an example flowchart of processing operations of a method that enables the various features and functionality of the systems as described in detail above. The processing operations of the method presented below are intended to be illustrative and non-limiting. In some embodiments, for example, the method may be accomplished with one or more additional operations not described, or without one or more of the operations discussed. Additionally, the order in which the processing operations of the method are illustrated (and described below) is not intended to be limiting.

Figure 5:
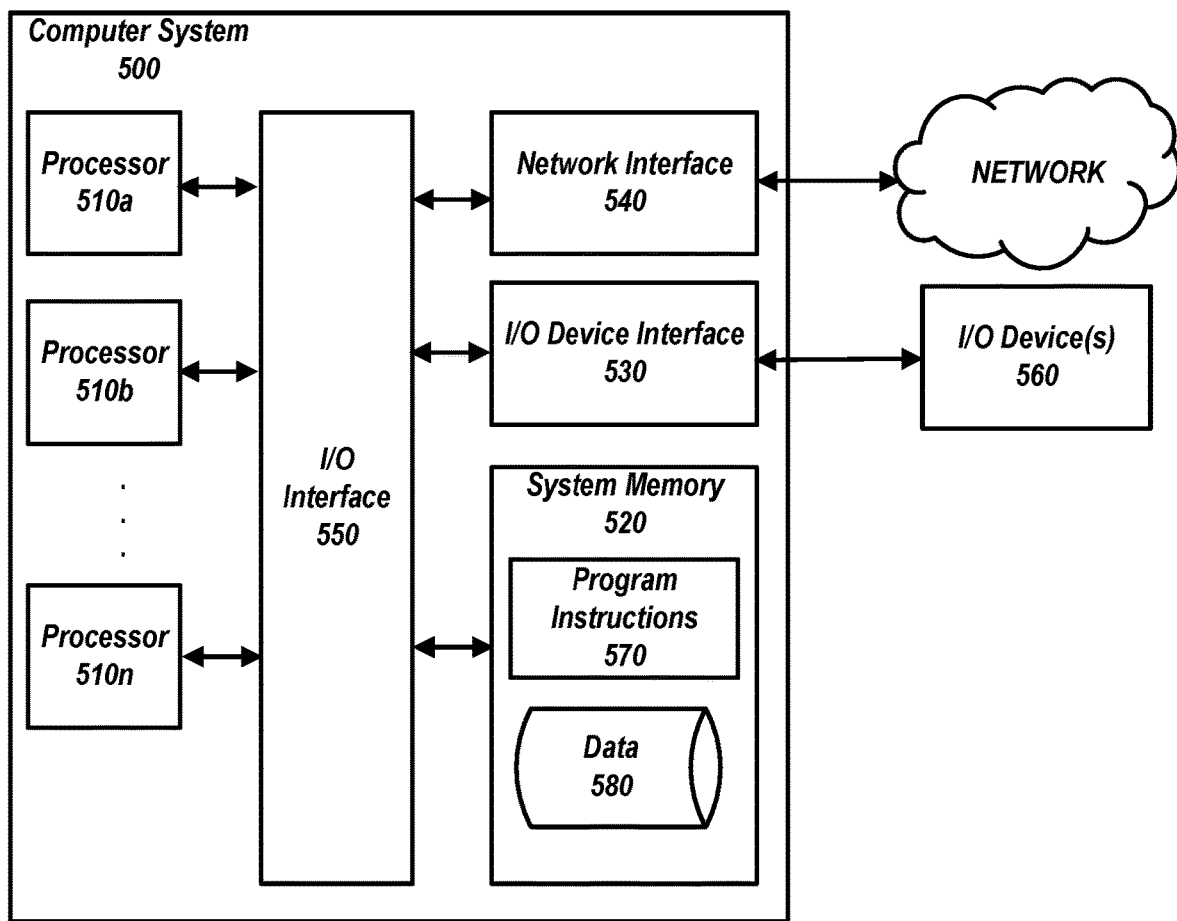
FIG. 5 shows an example computing system that may be used in accordance with some embodiments.

In some embodiments, the method may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the method in response to instructions stored electronically on an electronic storage medium. The processing devices may include one or more devices configured through hardware, firmware, or software to be specifically designed for execution of one or more of the operations of the method. It should be noted that, in some embodiments, the operations performed by authentication system 102 may be performed using one or more other components of system 100 (FIG. 1) or computer system 500 (FIG. 5).

Figure 3:
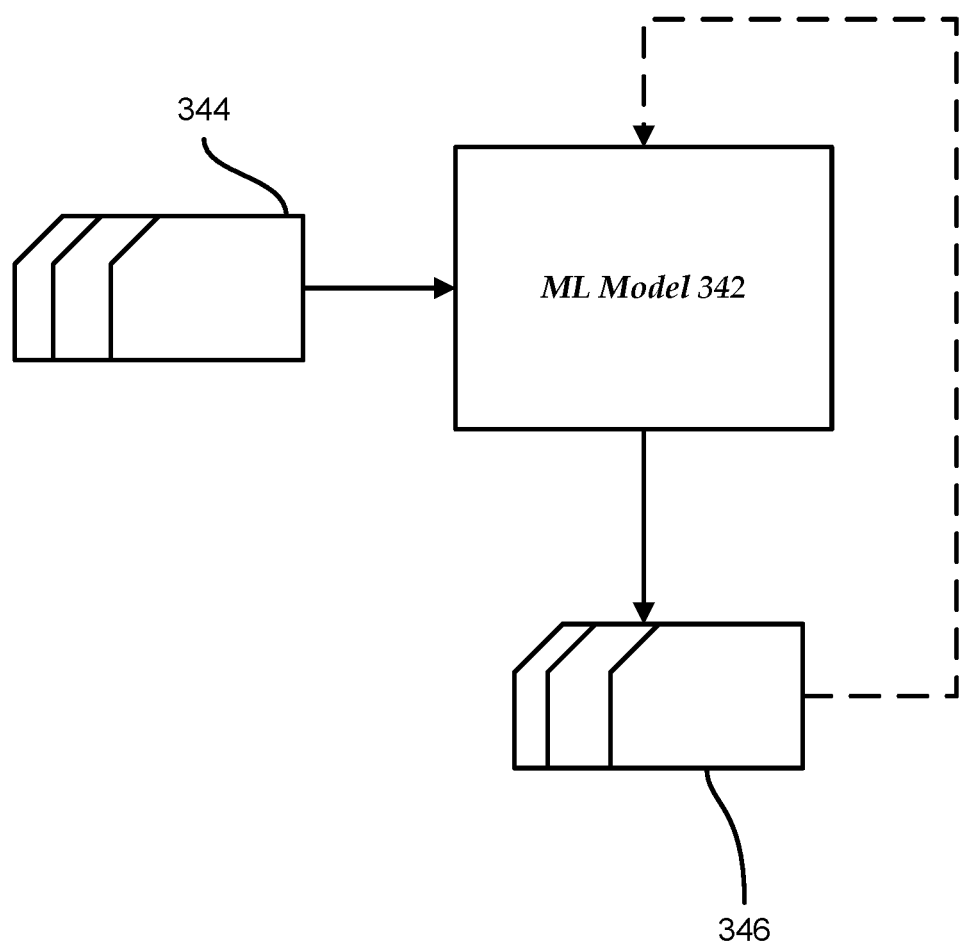
FIG. 3 shows an example machine learning model, in accordance with some embodiments.

One or more machine learning models discussed above may be implemented (e.g., in part), for example, as shown in FIG. 3. With respect to FIG. 3, machine learning model 342 may take inputs 344 and provide outputs 346. In one use case, outputs 346 may be fed back to machine learning model 342 as input to train machine learning model 342 (e.g., alone or in conjunction with user indications of the accuracy of outputs 346, with labels associated with the inputs, or with other reference feedback information). In another use case, machine learning model 342 may update its configurations (e.g., weights, biases, or other parameters) based on its assessment of its prediction (e.g., outputs 346) and reference feedback information (e.g., user indication of accuracy, reference labels, or other information). In another example use case, machine learning model 342 is a neural network, and connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 342 may be trained to generate results (e.g., modified processing requests, predicted actions as part of a reinforcement learning model, etc.) with better recall and/or precision. For example, the machine learning model 342 may take as input two images and may determine whether a face in one image belongs to the same person as a face shown in a second image.

In some embodiments, the machine learning model 342 may include an artificial neural network. In some embodiments, the machine learning model 342 may include an input layer and one or more hidden layers. Each neural unit of the machine learning model may be connected with one or more other neural units of the machine learning model 342. Such connections can be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 342 may be self-learning and/or trained, rather than explicitly programmed, and may perform significantly better in certain areas of problem solving, as compared to computer programs that do not use machine learning. During training, an output layer of the machine learning model 342 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 342 may include one or more embedding layers at which information or data (e.g., any data or information discussed above in connection with FIGS. 1-3) is converted into one or more vector representations.

The machine learning model 342 may be structured as a factorization machine model. The machine learning model 342 may be a non-linear model and/or supervised learning model that can perform classification and/or regression. For example, the machine learning model 342 may be a general-purpose supervised learning algorithm that the system uses for both classification and regression tasks.

FIG. 4 shows an example flowchart of the actions involved in user authentication. For example, process 400 may represent the actions taken by one or more devices shown in FIGS. 1-3 and described above. At 402, the authentication system 102 may receive location information of the user device 104. The location information may indicate a location of a user of the user device 104. For example, an application executing on the user device 104 may access location data (e.g., via GPS, Bluetooth, or other means) and send it to the authentication system 102. The user device 104 may send the location information to the authentication system 102, for example, if the user device 104 determines that it is within a threshold distance (e.g., 10 feet) of a local system (e.g., the local system 106) associated with the application.

At 404, the authentication system 102 may generate a temporary hash identification code. The authentication system 102 may generate the temporary hash identification code in response to determining that the location information received at 402 matches a location of a local auxiliary system (e.g., the local system 106). The temporary hash identification code may be valid for authenticating the user via the local auxiliary system during a given time period without the local auxiliary system obtaining PII of the user. For example, the authentication system 102 may send the temporary hash identification code to the user after determining that the user has entered a location (e.g., a store). The given time period may be the time period that the user is at the location, or some other time period (e.g., 15 minutes, 5 minutes, etc.).

In some embodiments, the temporary hash identification code may be invalid for authenticating the user via one or more other auxiliary systems at one or more other locations without the one or more other auxiliary systems obtaining any PII of the user. Further, through the use of the temporary hash identification code, the local system 106 or any other local system may not need to obtain PII (e.g., name, address, Social Security number, etc.) of the user to access account information, transaction information, or other data associated with the user.

In some embodiments, the temporary hash identification code may be generated via a hash function based on a user identifier associated with the user and a current time. For example, the identification code may be a one-time password, a time-based one-time password, or a hash message authentication code (HMAC) one-time password (HOTP). For example, the authentication system may use a variety of parameters, including, for example, the current time (e.g., the time the location information was received at 402), a cryptographic hash method (e.g., SHA-1), a secret key, a counter, and a HOTP value length (e.g., 6 characters, 8 characters, 10 characters, etc.) to generate the temporary hash identification code. The temporary hash identification code may use PII of the user as input into the hash method. For example, the user's name or address may be used as input into the hash method to generate the identification code.

At 406, the authentication system 102 may send the temporary hash identification code to the user device 104 as an identification code for the user for authentication at the local auxiliary system. For example, the temporary hash identification code may be input at the local system 106. The local system 106 may send the entered temporary hash identification code to the authentication system 102 for authentication. For example, if the temporary hash identification code received by the authentication system 102 matches the code sent at 406, the authentication system 102 may authenticate the user.

At 408, the authentication system 102 may receive a request to access data by a computing device at the location. For example, the local system 106 may send a request to the authentication system 102 for access to data associated with the user. The data may include account information, transaction information, account balances, credit scores, or a variety of other information.

At 410, the authentication system 102 may grant access to the data requested at 408. For example, the authentication system 102 may provide the requested access to the local auxiliary system by authenticating the user based on the temporary hash identification code. The authentication system 102 may also authenticate the user based on an auxiliary identifier (e.g., that identifies the local system 106) in the data access request. For example, the authentication system 102 may confirm that the identifier in the data access request corresponds to the location information received from the user device 104 at 402.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-3 could be used to perform one or more of the actions in FIG. 4.

FIG. 5 is a diagram that illustrates an exemplary computing system 500 in accordance with embodiments of the present technique. Various portions of systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an I/O device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatuses can also be implemented as, special purpose logic circuitry (e.g., a field-programmable gate array (FPGA) or an application-specific integrated circuit (ASIC)). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on a remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communication network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., RAM, static random access memory (SRAM), synchronous dynamic RAM (SDRAM)), bulk storage memory (e.g., CD-ROM or DVD-ROM, hard drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices).

I/O interface 550 may be configured to coordinate I/O traffic between processors 510a-510n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the peripheral component interconnect (PCI) bus standard or the USB standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a global positioning system (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. In some embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are organized differently than is presently depicted; for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the content explicitly indicates otherwise. Thus, for example, reference to "an element" or "the element" includes a combination of two or more elements, notwithstanding use of other terms and phrases for one or more elements, such as "one or more." The term "or" is, unless indicated otherwise, non-exclusive (i.e., encompassing both "and" and "or"). Terms describing conditional relationships, for example, "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompass both all such attributes or functions being mapped to all such objects and subsets of the attributes or functions being mapped to subsets of the attributes or functions (e.g., both or all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification, discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

1. A method comprising: receiving, via a user device, location information indicating a user location of a user of the user device; storing, based on the user location matching a location of an auxiliary system, a temporary cryptographic identification code in association with the user and the auxiliary system; after storing the temporary cryptographic identification code, receiving, from the auxiliary system, a data access request for access to data related to the user, the data access request comprising the temporary cryptographic identification code and an auxiliary identifier associated with the auxiliary system; and providing the requested access by authenticating the user based on the temporary cryptographic identification code and the auxiliary identifier in the data access request.
2. The method of any of the preceding embodiments, wherein authenticating the user further comprises: receiving, via one or more sensors at the auxiliary system, an identity token presented by the user; performing optical character recognition on the scanned image of the identity token to obtain token text;

determining that a portion of the token text corresponds to the temporary cryptographic identification code in the data access request; and authenticating the user based on (i) the determination that a portion of the token text corresponds to the temporary cryptographic identification code and (ii) identification of the user using the temporary cryptographic identification code and the auxiliary identifier.

3. The method of any of the preceding embodiments, wherein authenticating the user further comprises: obtaining, via a chip reader at the auxiliary system, token information of a token presented by user; and authenticating the user based on (i) the determination that an identifier of the token information corresponds to the temporary cryptographic identification code and (ii) identification of the user using the temporary cryptographic identification code and the auxiliary identifier.

4. The method of any of the preceding embodiments, wherein providing the requested access comprises: using the temporary cryptographic identification code as a parameter for retrieving the data related to the user by identifying the user using the temporary cryptographic identification code and the auxiliary identifier; and sending the data related to the user to the auxiliary system.

5. The method of any of the preceding embodiments, wherein authenticating the user further comprises: retrieving appointment information associated with the user and the location; determining, based on the appointment information, that the user is expected to be at the location at a time associated with the temporary cryptographic identification code; and authenticating the user based on determining that the user is expected to be at the location.

6. The method of any of the preceding embodiments, wherein the temporary cryptographic identification code is valid for authenticating the user via the auxiliary system during a given time period without the auxiliary system obtaining personally identifiable information of the user.

7. The method of any of the preceding embodiments, wherein the temporary cryptographic identification code is invalid for authenticating the user via one or more other auxiliary systems at one or more other locations without the one or more other auxiliary systems obtaining any personally identifiable information of the user.

8. The method of any of the preceding embodiments, wherein the temporary cryptographic identification code is generated via a hash function based on a user identifier associated with the user and a current time.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for using a short cryptographic identification code for user-related data retrieval by a local system without the local system using personally identifiable information of the related user, the system comprising:
one or more processors and non-transitory computer-readable media comprising instructions that, when executed by the one or more processors, cause operations comprising:
receiving, from a mobile device, location information indicating a user location of a user of the mobile device;
in response to the user location matching a location of a local auxiliary device that is local to the mobile device, generating a temporary hash identification code in association with the user and the local auxiliary device such that:
(i) the temporary hash identification code is valid for authenticating the user via the local auxiliary device during a given time period without the local auxiliary device obtaining personally identifiable information of the user;
(ii) the temporary hash identification code is invalid for authenticating the user via one or more other auxiliary devices at one or more other locations without the one or more other auxiliary devices obtaining any personally identifiable information of the user; and
(iii) the temporary hash identification code is generated via a hash function based on a user identifier associated with the user and a current time;
sending the temporary hash identification code to the mobile device as an identification code for the user for authenticating at the local auxiliary device;
in response to sending the temporary hash identification code to the mobile device, receiving, from the local auxiliary device, a data access request, generated by the local auxiliary device, for access to data related to the user, the data access request comprising the temporary hash identification code received from the mobile device and an auxiliary identifier associated with the local auxiliary device; and
providing the requested access to the local auxiliary device by authenticating the user based on (i) the temporary hash identification code and the auxiliary identifier in the data access request and (ii) an identifier of a token, obtained via a chip reader of the local auxiliary device, presented by the user matching the user identifier.

2. The system of claim 1, wherein authenticating the user further comprises:
obtaining, via a camera at the location of the local auxiliary device, a first image depicting the user at the location of the local auxiliary device;
determining, via a machine learning model, that a second image matches the first image, wherein the data related to the user comprises the second image; and
authenticating the user based on determining that the second image matches the first image.

3. The system of claim 1, wherein authenticating the user further comprises the local auxiliary device authenticating the user.

4. The system of claim 1, wherein authenticating a user further comprises:
retrieving appointment information associated with the user and the location; and
determining, based on the appointment information, that the user is expected to be at the location at the current time.

5. A method comprising:
receiving, from a mobile device, location information indicating a user location of a user of the mobile device;
in response to the user location matching a location of a local auxiliary device local to the mobile device, storing a temporary hash identification code in association with the user and the local auxiliary device, wherein (i) the user location matches the location of the local auxiliary device, (ii) the temporary hash identification code is valid for authenticating the user via the local auxiliary device during a given time period without the local auxiliary device obtaining personally identifiable information of the user, and (iii) the temporary hash identification code is invalid for authenticating the user via one or more other auxiliary devices at one or more other locations without the one or more other auxiliary devices obtaining any personally identifiable information of the user;
after storing the temporary hash identification code, receiving, from the local auxiliary device, a data access request, generated by the local auxiliary device, for access to data related to the user, the data access request comprising the temporary hash identification code received from the mobile device and an auxiliary identifier associated with the local auxiliary device; and
in response to receiving the data access request, providing the requested access by authenticating the user based on (i) an identifier of a token, obtained via a reader of the local auxiliary device, presented by the user corresponding to the temporary hash identification code and (ii) identification of the user using the temporary hash identification code and the auxiliary identifier.

6. The method of claim 5, wherein authenticating the user further comprises:
receiving, via one or more sensors at the local auxiliary device, an identity token presented by the user;
performing optical character recognition on a scanned image of the identity token to obtain token text;
determining that a portion of the token text corresponds to the temporary hash identification code in the data access request; and
authenticating the user based on (i) the determination that the portion of the token text corresponds to the temporary hash identification code and (ii) identification of the user using the temporary hash identification code and the auxiliary identifier.

7. The method of claim 5, wherein authenticating the user further comprises the local auxiliary device authenticating the user.

8. The method of claim 5, wherein providing the requested access comprises:
using the temporary hash identification code as a parameter for retrieving the data related to the user by identifying the user using the temporary hash identification code and the auxiliary identifier; and
sending the data related to the user to the local auxiliary device.

9. The method of claim 5, wherein authenticating the user further comprises:
retrieving appointment information associated with the user and the location of the local auxiliary device;
determining, based on the appointment information, that the user is expected to be at the location of the local auxiliary device at a time associated with the temporary hash identification code; and
authenticating the user based on determining that the user is expected to be at the location of the local auxiliary device.

10. The method of claim 5, wherein the token is a digital token.

11. The method of claim 5, wherein the token is a physical token.

12. The method of claim 10, wherein the temporary hash identification code is generated via a hash function based on a user identifier associated with the user and a current time.

13. One or more non-transitory computer-readable media storing instructions that, when executed by one or more processors, cause operations comprising:
receiving, via a user device, location information indicating a user location of a user of the user device;
storing, based on the user location matching a location of an auxiliary device, a temporary cryptographic identification code in association with the user and the auxiliary device, wherein (i) the temporary cryptographic identification code is valid for authenticating the user via the auxiliary device during a given time period without the auxiliary device obtaining personally identifiable information of the user and (ii) the temporary cryptographic identification code is invalid for authenticating the user via one or more other auxiliary devices at one or more other locations without the one or more other auxiliary devices obtaining any personally identifiable information of the user;
after storing the temporary cryptographic identification code, receiving, from the auxiliary device, a data access request, generated by the auxiliary device, for access to data related to the user, the data access request comprising the temporary cryptographic identification code received from the user device and an auxiliary identifier associated with the auxiliary device; and
providing the requested access by authenticating the user based on (i) an identifier of a token, obtained via an input of the auxiliary device, presented by the user corresponding to the temporary cryptographic identification code and (ii) identification of the user using the temporary cryptographic identification code and the auxiliary identifier.

14. The one or more non-transitory computer-readable media of claim 13, wherein authenticating the user further comprises:
receiving, via one or more sensors at the auxiliary device, an identity token presented by the user;
performing optical character recognition on a scanned image of the identity token to obtain token text;
determining that a portion of the token text corresponds to the temporary cryptographic identification code in the data access request; and
authenticating the user based on (i) the determination that the portion of the token text corresponds to the temporary cryptographic identification code and (ii) identification of the user using the temporary cryptographic identification code and the auxiliary identifier.

15. The one or more non-transitory computer-readable media of claim 13, wherein authenticating the user further comprises the auxiliary device authenticating the user.

16. The one or more non-transitory computer-readable media of claim 13, wherein providing the requested access comprises:
using the temporary cryptographic identification code as a parameter for retrieving the data related to the user by identifying the user using the temporary cryptographic identification code and the auxiliary identifier; and
sending the data related to the user to the auxiliary device.

17. The one or more non-transitory computer-readable media of claim 13, wherein authenticating the user further comprises:
- retrieving appointment information associated with the user and the location of the local auxiliary device;
- determining, based on the appointment information, that the user is expected to be at the location of the local auxiliary device at a time associated with the temporary cryptographic identification code; and
- authenticating the user based on determining that the user is expected to be at the location of the auxiliary device.

18. The one or more non-transitory computer-readable media of claim 13, wherein the token is a digital token.

19. The one or more non-transitory computer-readable media of claim 13, wherein the token is a physical token.

20. The one or more non-transitory computer-readable media of claim 18, wherein the temporary cryptographic identification code is generated via a hash function based on a user identifier associated with the user and a current time.

* * * * *